(12) United States Patent
Boesen

(10) Patent No.: US 12,299,479 B2
(45) Date of Patent: *May 13, 2025

(54) LOAD SHARING BETWEEN WIRELESS EARPIECES

(71) Applicant: BRAGI GmbH, Munich (DE)

(72) Inventor: Peter Vincent Boesen, Munich (DE)

(73) Assignee: BRAGI GMBH, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/059,303

(22) Filed: Nov. 28, 2022

(65) Prior Publication Data

US 2023/0092994 A1 Mar. 23, 2023

Related U.S. Application Data

(63) Continuation of application No. 15/912,814, filed on Mar. 6, 2018, now Pat. No. 11,544,104.
(Continued)

(51) Int. Cl.
*G06F 9/46* (2006.01)
*G06F 1/3212* (2019.01)
(Continued)

(52) U.S. Cl.
CPC .......... *G06F 9/4856* (2013.01); *G06F 1/3212* (2013.01); *G06F 1/329* (2013.01);
(Continued)

(58) Field of Classification Search
CPC ...... G06F 9/4856; G06F 1/3212; G06F 1/329; G06F 9/4893; G06F 9/5094
See application file for complete search history.

(56) References Cited

U.S. PATENT DOCUMENTS

| 2,325,590 A | 8/1943 | Carlisle et al. |
| 2,430,229 A | 11/1947 | Kelsey |
(Continued)

FOREIGN PATENT DOCUMENTS

| CN | 204244472 U | 4/2015 |
| CN | 104683519 A | 6/2015 |
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — Tammy E Lee
(74) *Attorney, Agent, or Firm* — Goodhue, Coleman & Owens, P.C.

(57) ABSTRACT

A method for off-loading tasks between a set of wireless earpieces in an embodiment of the present invention may have one or more of the following steps: (a) monitoring battery levels of the set of wireless earpieces, (b) determining the first wireless earpiece battery level and the second wireless battery level, (c) communicating the battery levels of each wireless earpiece to the other wireless earpiece of the set of wireless earpieces, (d) assigning a first task involving one or more of the following: computing tasks, background tasks, audio processing tasks, and sensor data analysis tasks from one of the set of wireless earpieces to the other wireless earpiece if the battery level of the one of the set of wireless earpieces falls below a critical threshold, (e) communicating data for use in performing a second task to the other wireless earpiece if the second task is communicated to the first wireless earpiece.

20 Claims, 7 Drawing Sheets

Related U.S. Application Data

(60) Provisional application No. 62/474,974, filed on Mar. 22, 2017.

(51) Int. Cl.
*G06F 1/329* (2019.01)
*G06F 9/48* (2006.01)
*G06F 9/50* (2006.01)
*H04M 1/60* (2006.01)
*H04R 1/10* (2006.01)

(52) U.S. Cl.
CPC .......... *G06F 9/4893* (2013.01); *G06F 9/5094* (2013.01); *H04M 1/6066* (2013.01); *H04M 2250/12* (2013.01); *H04R 1/1016* (2013.01); *H04R 1/1091* (2013.01); *H04R 2460/03* (2013.01)

(56) References Cited

U.S. PATENT DOCUMENTS

| | | | |
|---|---|---|---|
| 3,047,089 A | 7/1962 | Zwislocki |
| D208,784 S | 10/1967 | Sanzone |
| 3,586,794 A | 6/1971 | Michaelis |
| 3,696,377 A | 10/1972 | Wall |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin et al. |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,461,403 B2 | 10/2016 | Gao et al. |

(56) References Cited

U.S. PATENT DOCUMENTS

| | | |
|---|---|---|
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,711,062 B2 | 7/2017 | Ellis et al. |
| 9,729,979 B2 | 8/2017 | Özden |
| 9,767,709 B2 | 9/2017 | Ellis |
| 9,848,257 B2 | 12/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Air et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0102009 A1 | 5/2007 | Wong et al. |
| 2007/0239225 A1 | 10/2007 | Saringer |
| 2007/0269785 A1 | 11/2007 | Yamanoi |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein |
| 2008/0215239 A1 | 9/2008 | Lee |
| 2008/0253583 A1 | 10/2008 | Goldstein |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0197532 A1 | 8/2009 | Wyper |
| 2009/0226017 A1 | 9/2009 | Abolfathi et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0033313 A1 | 2/2010 | Keady et al. |
| 2010/0166206 A1 | 7/2010 | Macours |
| 2010/0203831 A1 | 8/2010 | Muth |
| 2010/0210212 A1 | 8/2010 | Sato |
| 2010/0290636 A1 | 11/2010 | Mao et al. |
| 2010/0320961 A1 | 12/2010 | Castillo et al. |
| 2011/0010717 A1 | 1/2011 | Yamaoka et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0163626 A1 | 6/2012 | Booij et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0276227 A1 | 9/2014 | Pérez |
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0134954 A1 | 5/2015 | Walley et al. |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0100262 A1 | 4/2016 | Nagaki |

(56) References Cited

U.S. PATENT DOCUMENTS

| | | |
|---|---|---|
| 2016/0119737 A1 | 4/2016 | Mehnert et al. |
| 2016/0124707 A1 | 5/2016 | Ermilov |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0219358 A1 | 7/2016 | Shaffer |
| 2016/0253994 A1 | 9/2016 | Panchapagesan et al. |
| 2016/0324478 A1 | 11/2016 | Goldstein |
| 2016/0353196 A1 | 12/2016 | Baker et al. |
| 2016/0360350 A1 | 12/2016 | Watson et al. |
| 2017/0021257 A1 | 1/2017 | Gilbert |
| 2017/0046503 A1* | 2/2017 | Cho ................. G16H 40/63 |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164089 A1 | 6/2017 | Lee et al. |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0301337 A1 | 10/2017 | Golani et al. |
| 2017/0311105 A1 | 10/2017 | Hariharan et al. |
| 2017/0358313 A1 | 12/2017 | Shih |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |
| 2018/0067712 A1* | 3/2018 | Behzadi ................. G06F 13/128 |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 11/1981 |
| GB | 2508226 A | 5/2014 |
| JP | 06292195 | 10/1998 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.

Announcing the $3,333,333 Stretch Goal (Feb. 24, 2014) pp. 1-14.

Ben Coxworth: "Graphene-based ink could enable low-cost, foldable electronics", "Journal of Physical Chemistry Letters", Northwestern University, (May 22, 2013), pp. 1-7.

Blain: "World's first graphene speaker already superior to Sennheiser MX400", htt://www.gizmag.com/graphene-speaker-beats-sennheiser-mx400/31660, (Apr. 15, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

BRAGI Is On Facebook (2014), pp. 1-51.

BRAGI Update—Arrival Of Prototype Chassis Parts—More People—Awesomeness (May 13, 2014), pp. 1-8.

BRAGI Update—Chinese New Year, Design Verification, Charging Case, More People, Timeline(Mar. 6, 2015), pp. 1-18.

BRAGI Update—First Sleeves From Prototype Tool—Software Development Kit (Jun. 5, 2014), pp. 1-8.

(56) References Cited

OTHER PUBLICATIONS

BRAGI Update—Let's Get Ready To Rumble, A Lot To Be Done Over Christmas (Dec. 22, 2014), pp. 1-18.
BRAGI Update—Memories From April—Update On Progress (Sep. 16, 2014), pp. 1-15.
BRAGI Update—Memories from May—Update On Progress—Sweet (Oct. 13, 2014), pp. 1-16.
BRAGI Update—Memories From One Month Before Kickstarter—Update On Progress (Jul. 10, 2014), pp. 1-17.
BRAGI Update—Memories From The First Month of Kickstarter—Update on Progress (Aug. 1, 2014), pp. 1-16.
BRAGI Update—Memories From The Second Month of Kickstarter—Update On Progress (Aug. 22, 2014), pp. 1-15.
BRAGI Update—New People @BRAGI—Prototypes (Jun. 26, 2014), pp. 1-9.
BRAGI Update—Office Tour, Tour To China, Tour to CES (Dec. 11, 2014), pp. 1-14.
BRAGI Update—Status On Wireless, Bits and Pieces, Testing-Oh Yeah, Timeline(Apr. 24, 2015), pp. 1-18.
BRAGI Update—The App Preview, The Charger, The SDK, BRAGI Funding and Chinese New Year (Feb. 11, 2015), pp. 1-19.
BRAGI Update—What We Did Over Christmas, Las Vegas & CES (Jan. 19, 2014), pp. 1-21.
BRAGI Update—Years of Development, Moments of Utter Joy and Finishing What We Started(Jun. 5, 2015), pp. 1-21.
BRAGI Update—Alpha 5 and Back To China, Backer Day, On Track(May 16, 2015), pp. 1-15.
BRAGI Update—Beta2 Production and Factory Line(Aug. 20, 2015), pp. 1-16.
BRAGI Update—Certifications, Production, Ramping Up (Nov. 13, 2015), pp. 1-15.
BRAGI Update—Developer Units Shipping and Status(Oct. 5, 2015), pp. 1-20.
BRAGI Update—Developer Units Started Shipping and Status (Oct. 19, 2015), pp. 1-20.
BRAGI Update—Developer Units, Investment, Story and Status(Nov. 2, 2015), pp. 1-14.
BRAGI Update—Getting Close(Aug. 6, 2015), pp. 1-20.
BRAGI Update—On Track, Design Verification, How It Works and What's Next(Jul. 15, 2015), pp. 1-17.
BRAGI Update—On Track, On Track and Gems Overview (Jun. 24, 15), pp. 1-19.
BRAGI Update—Status On Wireless, Supply, Timeline and Open House@BRAGI(Apr. 1, 2015), pp. 1-17.
BRAGI Update—Unpacking Video, Reviews On Audio Perform and Boy Are We Getting Close(Sep. 10, 2015), pp. 1-15.
Healthcare Risk Management Review, "Nuance updates computer-assisted physician documentation solution" (Oct. 20, 2016), pp. 1-2.
Hoffman, "How to Use Android Beam to Wirelessly Transfer Content Between Devices", (Feb. 22, 2013).
Hoyt et al., "Lessons Learned from Implementation of Voice Recognition for Documentation in the Military Electronic Health Record System", The American Health Information Management Association (2017), pp. 1-8.
Hyundai Motor America, "Hyundai Motor Company Introduces A Health + Mobility Concept For Wellness In Mobility", Fountain Valley, California (2017), pp. 1-3.
International Search Report & Written Opinion, PCT/EP2016/070216 (Oct. 18, 2016) 13 pages.
International Search Report & Written Opinion, PCT/EP2016/070231 (Nov. 18, 2016) 12 pages.
International Search Report & Written Opinion, PCT/EP2016/070245 (Nov. 16, 2016) 10 pages.
International Search Report & Written Opinion, PCT/EP2016/070247 (Nov. 18, 2016) 13 pages.
International Search Report and Written Opinion, PCT/EP2016/070228 (Jan. 9, 2017) 13 pages.
Jain A et al: "Score normalization in multimodal biometric systems", Pattern Recognition, Elsevier, GB, vol. 38, No. 12, Dec. 31, 2005, pp. 2270-2285, XP027610849, ISSN: 0031-3203.
Last Push Before The Kickstarter Campaign Ends on Monday 4pm CET (Mar. 28, 2014), pp. 1-7.
Nemanja Paunovic et al, "A methodology for testing complex professional electronic systems", Serbian Journal of Electrical Engineering, vol. 9, No. 1, Feb. 1, 2012, pp. 71-80, XP055317584, Yu.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014), pp. 1-14.
Stretchgoal—The Carrying Case for The Dash (Feb. 12, 2014), pp. 1-9.
Stretchgoal—Windows Phone Support (Feb. 17, 2014), pp. 1-17.
The Dash + The Charging Case & The BRAGI News (Feb. 21, 2014), pp. 1-12.
The Dash—A Word From Our Software, Mechanical and Acoustics Team + An Update (Mar. 11, 2014), pp. 1-7.
Update From BRAGI—$3,000,000—Yipee (Mar. 22, 2014), pp. 1-11.
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

\* cited by examiner

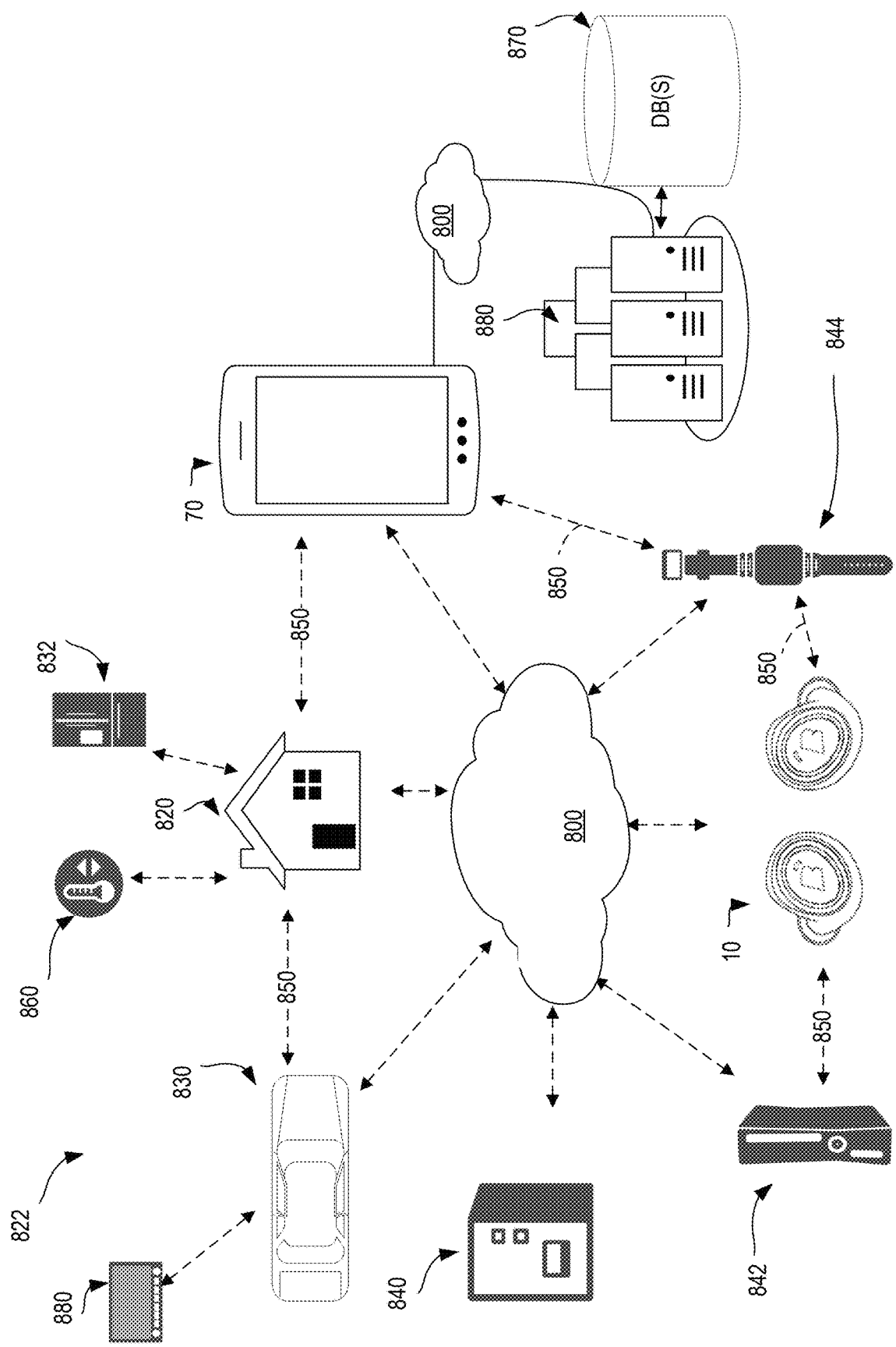

LOAD SHARING BETWEEN WIRELESS EARPIECES

PRIORITY STATEMENT

This application is a continuation of U.S. Non-Provisional patent application Ser. No. 15/912,814, filed Mar. 6, 2018 which claims priority to U.S. Provisional Patent Application 62/474,974, filed on Mar. 22, 2017, both entitled Load Sharing Between Wireless Earpieces, hereby incorporated by reference in their entireties.

FIELD OF THE INVENTION

The illustrative embodiments relate to personal electronics. Particularly, illustrative embodiments of the present invention relate to task and/or load sharing between personal electronics. More particularly, but not exclusively, the illustrative embodiments relate to load sharing between wireless earpieces.

BACKGROUND

Microprocessors are general-purpose processors providing high instruction throughputs to execute software running thereon and can have a wide range of processing requirements depending on the software applications involved.

Many different types of processors are known, of which microprocessors are but one example. For example, Digital Signal Processors (DSPs) are widely used, for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

To further improve performance of a digital system, two or more processors can be interconnected. For example, a DSP may be interconnected with a general-purpose processor in a digital system. The DSP performs numeric intensive signal processing algorithms while the general-purpose processor manages overall control flow. The two processors communicate and transfer data for signal processing via shared memory. A direct memory access (DMA) controller is often associated with a processor to take over the burden of transferring blocks of data from one memory or peripheral resource to another and to thereby improve the performance of the processor.

Modular programming builds a computer program by combining independently executable units of computer code (known as modules), and by tying modules together with additional computer code. Features and functionality not provided by a single module may be added to a computer program by using additional modules.

The design of a computer programming unit known as a task (or function) is often accomplished through modular programming, where a specific task is comprised of one module and the additional computer code needed to complete the task (if any additional code is needed). However, a task may be defined as broadly as a grouping of modules and additional computer codes, or, as narrowly as a single assembly-type stepwise command. A computer program may be processed (also called "run" or "executed") in a variety of manners. One manner is to process the computer code sequentially, as the computer code appears on a written page or on a computer screen, one command at a time. An alternative manner of processing computer code is called task processing. In task processing, a computer may process computer code one task at a time. or may process multiple tasks simultaneously.

Various tasks may operate on a set of data stored in memory. The various tasks may be executed on various processors having shared access to the memory. Accordingly, there is needed a system and method for managing task processing considering resource capabilities and capacity, and other task processing needs.

Batteries currently used in wireless devices tend to require frequent recharging when in use. This can be problematic when the wireless device needs to perform computationally intensive tasks with low battery life, as it cannot always be anticipated when the wireless device will need to perform a computationally intensive task. Wireless earpieces are no different. The battery of the wireless earpieces may have a particularly small footprint. However, one wireless earpiece may need to perform power intensive tasks and may not have the battery life to perform or complete the tasks.

SUMMARY

Therefore, it is a primary object, feature, or advantage of the illustrative embodiments to improve over the state of the art.

A method for battery management between a set of wireless earpieces in an embodiment of the present invention may have one or more of the following steps: (a) monitoring a first battery level of a first battery within a first wireless earpiece using a first sensor operatively coupled to the first battery and disposed within the first wireless earpiece, (b) monitoring a second battery level of a second battery within a second wireless earpiece using a second sensor operatively coupled to the second battery and disposed within the second wireless earpiece, (c) determining the first wireless earpiece battery level and the second wireless battery level in order assign a first task to either the first wireless earpiece or the second wireless earpiece based off the first battery level and the second battery level, (d) assigning the first task to the first wireless earpiece in response to the second earpiece battery level being below a critical threshold, (e) assigning the first task to the second wireless earpiece in response to the first earpiece battery level being below a critical threshold, (f) communicating the first task to the first wireless earpiece via a second transceiver operably located within the second wireless earpiece in response to the second earpiece level being below the critical threshold, (g) communicating to the second wireless earpiece via a first transceiver operably located within the first wireless earpiece in response to the first earpiece battery level being below a critical threshold, (h) communicating the first task to the second wireless earpiece via the first transceiver in response to a first processor of the first wireless earpiece being utilized beyond a first threshold, (i) communicating a second task to the first wireless earpiece via the second transceiver in response a second processor of the second wireless earpiece being utilized beyond a second threshold, and (j) parsing the first task between the first wireless earpiece and the second wireless earpiece.

A method for off-loading tasks between a set of wireless earpieces in an embodiment of the present invention may have one or more of the following steps: (a) monitoring battery levels of the set of wireless earpieces, (b) determining the first wireless earpiece battery level and the second wireless battery level, (c) communicating the battery levels of each wireless earpiece to the other wireless earpiece of the set of wireless earpieces, (d) assigning a first task involving one or more of the following: computing tasks, background tasks, audio processing tasks, and sensor data analysis tasks from one of the set of wireless earpieces to the other wireless earpiece if the battery level of the one of the set of wireless earpieces falls below a critical threshold, (e) communicating data for use in performing a second task to the other wireless earpiece if the second task is communicated to the first wireless earpiece.

A load sharing system in embodiments of the present invention may have one or more of the following features: (a) a wireless earpiece having one or more of the following features: (i) an earpiece housing, (ii) a processor operably coupled within the earpiece housing, (iii) a microphone operably coupled with the processor, (iv) a speaker operably coupled with the processor, (v) a battery operably coupled with the processor, (vi) sensors operably coupled with the processor, (vii) a transceiver operably coupled with the processor wherein the wireless earpiece can couple with an Internet of Things (IoT) network and pair with a constrained intelligent edge real time embedded device (CIERTED) and the wireless earpiece can transmit via the transceiver data and/or tasks to be processed by the CIERTED to conserve the battery, (b) a second wireless earpiece having one or more of the following features: (i) an earpiece housing, (ii) a processor operably coupled within the earpiece housing, (iii) a microphone operably coupled with the processor, (iv) a speaker operably coupled with the processor, (v) a battery operably coupled with the processor, (vi) sensors operably coupled with the processor, (vii) a transceiver operably coupled with the processor wherein the second wireless earpiece can couple with an Internet of Things (IoT) network and pair with a constrained intelligent edge real time embedded device (CIERTED) and the second wireless earpiece can transmit via the transceiver data and/or tasks to be processed by the CIERTED to conserve the battery.

One or more of these and/or other objects, features, or advantages of the illustrative embodiments will become apparent from the specification and claims following. No single embodiment need provide every object, feature, or advantage. Different embodiments may have different objects, features, or advantages. Therefore, the illustrative embodiments are not to be limited to or by any object, feature, or advantage stated herein.

BRIEF DESCRIPTION OF THE DRAWINGS

Illustrated embodiments of the disclosure are described in detail below with reference to the attached drawing figures, which are incorporated by reference herein.

FIG. 7 illustrates embedded devices within an IoT network in an illustrative embodiment.

DETAILED DESCRIPTION

Figure 1:
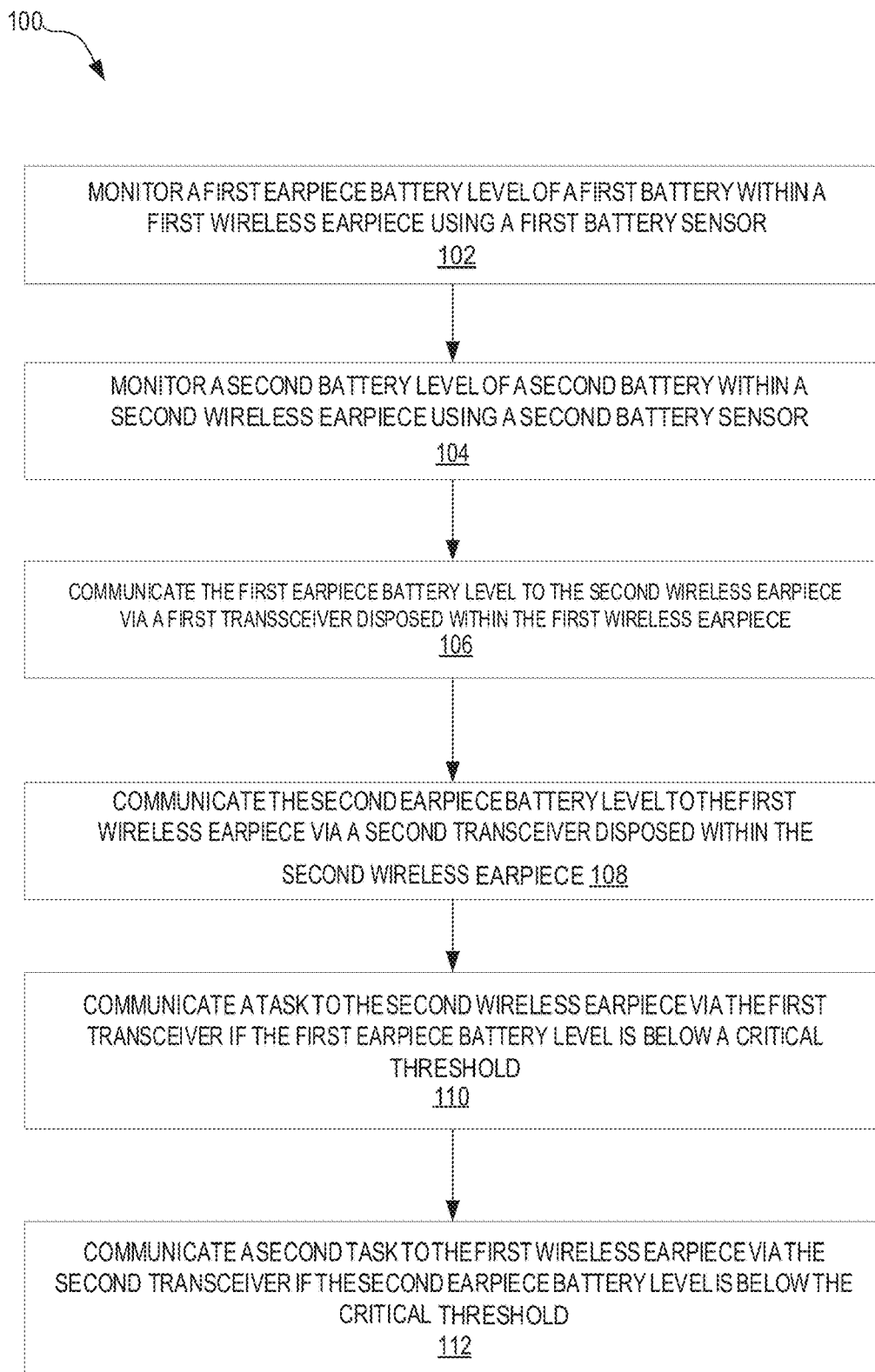
FIG. 1 illustrates a flowchart of a method for battery management between a set of wireless earpieces in accordance with an illustrative embodiment.

The following discussion is presented to enable a person skilled in the art to make and use the present teachings. Various modifications to the illustrated embodiments will be clear to those skilled in the art, and the generic principles herein may be applied to other embodiments and applications without departing from the present teachings. Thus, the present teachings are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of task and/or load sharing between wireless earpieces, it is fully contemplated embodiments of the present invention could be used in most any task and/or load sharing application without departing from the spirit of the invention.

It is an object, feature, or advantage of the illustrative embodiments to maximize the useful battery life of a set of wireless earpieces by transferring a portion or the entirety of one or more tasks run on one earpiece of the set of wireless earpieces to another earpiece of the set of wireless earpieces. The illustrative embodiments provide a system and method for load sharing between two or more wireless earpieces to maximize the useful battery life of the wireless earpieces.

It is a still further object, feature, or advantage of the illustrative embodiments to transfer a portion or the entirety of one or more tasks in response to a battery of one of the wireless earpieces reaching a critical threshold.

Another object, feature, or advantage is to transfer one or more tasks using a near field magnetic induction transceiver.

Yet another object, feature, or advantage is to transfer data in addition to tasks when transferring a task between earpieces.

Yet another object, feature, or advantage is to be able to transfer tasks between the set of wireless earpieces using a mobile device.

In one embodiment, a method for battery management between a set of wireless earpieces includes monitoring a first earpiece battery level of a first battery within a first earpiece using a first battery sensor operatively coupled to the first battery and disposed within the first earpiece, monitoring a second earpiece battery level of a second battery within a second wireless earpiece using a second battery sensor operatively coupled to the second battery and disposed within the second wireless earpiece, determining the first wireless earpiece battery level and the second wireless battery level between the set of wireless earpieces in order assign a first task to either the first wireless earpiece or the second wireless earpiece based off the first battery level and the second battery level, assigning a first task to the first wireless earpiece via second transceiver in response to the second earpiece battery level being below a critical threshold or to the second wireless earpiece via first transceiver in response to the second earpiece battery level being below a critical threshold, and communicating a first task to the first wireless earpiece via the second transceiver in response to the second earpiece level is below the critical threshold or to the second wireless earpiece via first transceiver in response to the second earpiece battery level being below a critical threshold.

One or more of the following features may be included. The first transceiver may be a first NFMI transceiver and the second transceiver may be a second NFMI transceiver. The communication of the first task may be performed using the first NFMI transceiver. The communication of the second task may be performed using the second NFMI transceiver. The first earpiece may be a left earpiece and the second wireless earpiece may be a right earpiece. The monitoring of the first battery level and the monitoring of the second battery level may be performed continuously. The communication of the first battery level and the communication of the second battery level may be performed continuously. The first task and the second task may be computing tasks. The computing tasks may be background tasks. The computing tasks may be audio processing tasks. The computing tasks may be sensor data analysis tasks. First data may be communicated for use in performing the first task to the second wireless earpiece if the first task is communicated to the second wireless earpiece. Second data may be communicated for use in performing the second task to the first earpiece if the second task is communicated to the first earpiece.

In another embodiment, a set of wireless earpieces includes a first earpiece and a second wireless earpiece, wherein the first earpiece and the second wireless earpiece each comprise an earpiece housing, a microphone, a speaker, a battery, a battery sensor, a transceiver, and a processor. Additionally, the battery sensor of the first earpiece is configured to sense a battery level of the battery of the first earpiece and the battery sensor of the second wireless earpiece is configured to sense a battery level of the battery of the second wireless earpiece. Additionally, the battery level of the first earpiece is communicated to the second wireless earpiece via the transceiver of the first earpiece and the battery level of the second wireless earpiece is communicated to the first earpiece via the transceiver of the second wireless earpiece. Additionally, the processor of the first earpiece is programmed to instruct the transceiver of the first earpiece to transmit a first signal encoding a first task to the transceiver of the second wireless earpiece if the battery level of the second wireless earpiece is greater than the battery level of the first earpiece. Finally, the processor of the second wireless earpiece is programmed to instruct the transceiver of the second wireless earpiece to transmit a second signal encoding a second task to the transceiver of the first earpiece if the battery level of the first earpiece is greater than the battery level of the second wireless earpiece.

One or more of the following features may be included. The battery sensor of the first earpiece may include a voltage divider and a current sensor and the battery sensor of the second wireless earpiece may also include a voltage divider and a current sensor. The battery sensor of the first earpiece may be configured to determine the battery life remaining on the battery of the first earpiece using a charge counting method and the battery sensor of the second wireless earpiece may also be configured to determine the battery life remaining on the battery of the second wireless earpiece using a charge counting method. The first earpiece may further include a first sensor operatively coupled to the earpiece housing, battery, and processor of the first earpiece and the second wireless earpiece may also further include a second sensor operatively coupled to the earpiece housing, battery, and processor of the second wireless earpiece. The first sensor may include a first pulse oximeter and the second sensor may include a second pulse oximeter.

The illustrative embodiments provide a system, method, and wireless earpieces for performing load balancing. In one embodiment, the wireless earpieces may represent a set or pair of wireless earpieces, such as a left wireless earpiece and a right wireless earpiece. In other embodiments, the wireless earpieces may represent several left or right wireless earpieces.

The battery level and status of each of the wireless earpieces may be measured and communicated between the wireless earpieces. In addition, other status information, such as temperature, processing load, tasks being performed (or anticipated), and so forth, may be tracked for each of the wireless earpieces. The illustrative embodiments may be utilized to transfer or communicate tasks between the wireless earpieces. The tasks may be transferred, off-loaded, or load balanced between the wireless earpieces to preserve battery life, ensure efficiency, and maximize operation. The tasks may be transmitted utilizing the battery level of the wireless earpieces (one is greater than another), battery thresholds, processing loads, and so forth.

FIG. 1 illustrates a method for battery management between a set of wireless earpieces 100 in accordance with an illustrative embodiment. In one embodiment, the process of FIG. 1 may be implemented by a set of wireless earpieces configured for utilization together. First, in step 102, a first wireless earpiece monitors a first earpiece battery level of a first battery using a first battery sensor. Any number of status, usage, or reservoir readings may be performed to determine the status and fill level of the first wireless earpiece. Battery and utilization information may be utilized to monitor the first earpiece battery level, including, but not limited to battery capacity (e.g., milli-Ampere-hours—mAh), drain (e.g., peak, average, minimum, etc.), functionality and component utilization (e.g., transceivers, noise cancellation, microphone and speaker utilization, audio transparency, etc.), and so forth. Estimations of the first earpiece battery life may be revised and recalculated as needed based on changes in measurements, different environmental or user conditions, and so forth.

In step 104, a second wireless earpiece monitors a second earpiece battery level of a second battery using a second battery sensor. In one embodiment, each monitoring may further include measuring the voltage across the terminals of the battery with no load attached and comparing the measured voltage to a discharge curve, measuring the flow of current over a specific timeframe to determine the amount of charge used and subtracting the amount of charge from an initial charge state, or impedance spectroscopy.

In step 106, the battery level of the first wireless earpiece and the battery level of the second earpiece is determined to assign a task to either the first wireless earpiece or the second wireless earpiece based on the battery levels. In one embodiment, a determination of whether the first earpiece battery level and the second earpiece battery level may benefit from off-loading or transferring tasks is performed by the respective wireless earpieces. In one embodiment, steps 108 and 110 may be performed by one of the wireless earpieces if the other wireless earpiece has available battery life as well as processing power. Tasks may not be communicated if the wireless earpieces have insufficient battery level or are being fully utilized.

In step 108 the second wireless earpiece assigns a task to the first wireless earpiece using a second transceiver if the second battery level is below a critical threshold. In one embodiment, the first transceiver and the second transceiver may be near field magnetic induction (NFMI) transceivers, and the communication of the battery levels of each earpiece may be performed intermittently as needed or may be performed continuously. In other embodiments, the transceivers may represent Bluetooth, Wi-Fi, or other short range wireless communications. In one embodiment, the data may be encapsulated in a packet or other data format exchanged between the first wireless earpiece and the second wireless earpiece. Alternatively, any number of other signals, data structures, formats, protocols, or standards may be utilized. In step 110 the first wireless earpiece assigns a task to the second wireless earpiece using a first transceiver if the first battery level is below a critical threshold.

In step 112, a task of the second wireless earpiece is communicated to the first wireless earpiece if the second earpiece battery level of the second wireless earpiece falls below the critical threshold. In one example, the tasks of step 112 may be background tasks (e.g. an antivirus program), sensor data analysis tasks (e.g., monitoring physiological data obtained from a pulse oximeter) audio processing tasks (e.g., modifying an ambient sound or communicating songs or instructions). The critical threshold for assigning a task to the other wireless earpiece may be preset by the user, preset using one or more programs or applications, or dependent on the program or application currently running on the earpiece, and only a portion of the task may be communicated for the other earpiece to perform.

In one embodiment, the critical level for the first wireless earpiece and the second wireless earpiece may vary. For example, one of the wireless earpieces may have a transceiver for communicating with externally coupled devices while the other wireless earpiece may not have the same transceiver reducing battery life accordingly. As a result, the critical thresholds may vary as do the associated battery capacities and utilization.

In addition, additional data, programs, applications, or algorithms may be communicated for use in performing a task. For example, if the second wireless earpiece is executing a program to measure the heart rate and the blood oxygen level of a user during a fitness routine and the second earpiece battery level falls to the critical threshold, the second wireless earpiece may communicate instructions to the first wireless earpiece (as well as any necessary programs or algorithms) to only monitor the user's heart rate while the second wireless earpiece continues to monitor the blood oxygen level. In addition, tasks may be communicated between the wireless earpieces if one wireless earpiece has substantially more battery life than the other earpiece notwithstanding the fact the earpiece with the lower battery life may not have reached the critical threshold.

As noted, the tasks may not be communicated by either of the wireless earpieces if the associated battery levels are above the critical threshold. In addition, the processor or logic utilization may be utilized as a single factor or combined factor (e.g., battery level and processor utilization) to communicate the tasks between the wireless earpieces.

Figure 2:
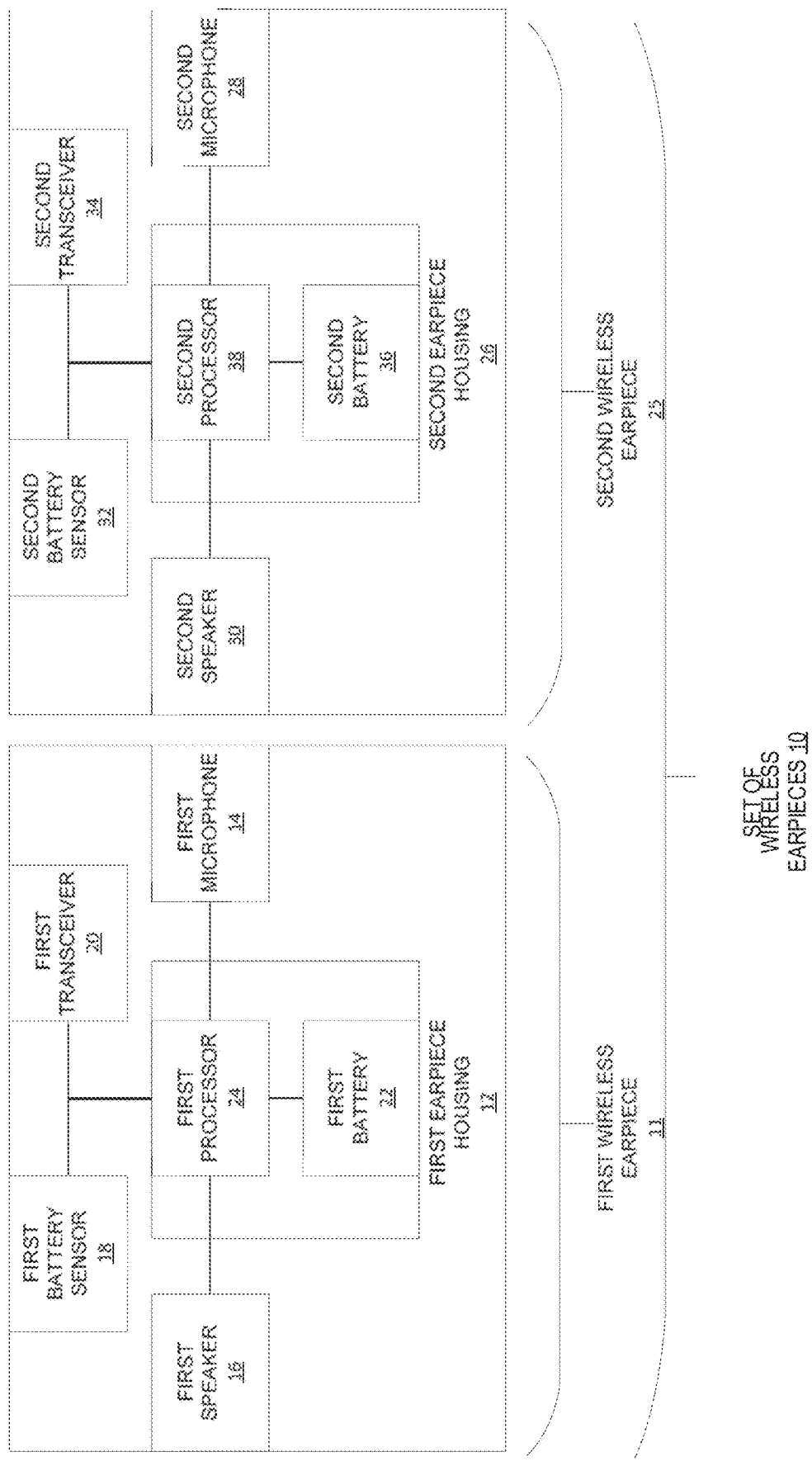
FIG. 2 illustrates a block diagram of one embodiment of a set of wireless earpieces in accordance with an illustrative embodiment.

FIG. 2 illustrates a block diagram of the set of wireless earpieces 10 in accordance with an illustrative embodiment. The set of wireless earpieces 10 includes a first wireless earpiece 11 and a second wireless earpiece 25. The first wireless earpiece 11 includes a first earpiece housing 12, a first microphone 14 operatively coupled to the first earpiece housing 12, a first speaker 16 operatively coupled to the first earpiece housing 12, a first battery sensor 18 operatively coupled to the first earpiece housing 12, a first transceiver 20 operatively coupled to the first earpiece housing 12, a first battery 22 disposed within the first earpiece housing 12 and operatively coupled to each component of the first wireless earpiece 11, and a first processor 24 disposed within the first earpiece housing 12 and operatively coupled to each component of the first wireless earpiece 11.

The second wireless earpiece 25 includes a second earpiece housing 26, a second microphone 28 operatively coupled to the second earpiece housing 26, a second speaker 30 operatively coupled to the second earpiece housing 26, a second battery sensor 32 operatively coupled to the second earpiece housing 26, a second transceiver 34 operatively coupled to the second earpiece housing 26, a second battery 36 disposed within the second earpiece housing 26 and operatively coupled to each component of the second wireless earpiece 25, and a second processor 38 disposed within the second earpiece housing 26 and operatively coupled to each component of the second wireless earpiece 25. The first battery 22 and the second battery 36 may represent any number of batteries, ultracapacitors, fuel cells, solar cells, or energy storage devices. Examples of common battery types may include NiCad, NiMH, Lithium ion, zinc air, silver oxide, lithium hybrids, and so forth. The first battery 22 and second battery 36 may be rechargeable or one-time use batteries. For example, contacts of the wireless earpieces 10 may be utilized to charge the batteries 22, 36 in a smart case or so forth. Inductive charging circuits and interfaces may also be utilized.

The first earpiece housing 12 and the second earpiece housing 26 may be formed from plastic, polymers, metals, nonmetals, or any material or combination of materials having substantial deformation resistance to facilitate energy transfer if a sudden force is applied to the first wireless earpiece 11 or the second wireless earpiece 25. For example, if one of the wireless earpieces is dropped by the user, the earpiece housings 12, 26 may transfer the energy received from the surface impact throughout the entire dropped wireless earpiece 10. In addition, each earpiece housing 12, 16 may be capable of a degree of flexibility to facilitate energy absorbance if one or more forces is applied to the first wireless earpiece 11 or the second wireless earpiece 25. For example, if an object is dropped on one of the wireless earpieces 10, the earpiece may bend to absorb the energy from the impact so the components within the earpiece are not substantially damaged. The flexibility of the first earpiece housing 12 and second earpiece housing 26 should not, however, be flexible to the point where one or more components of the first wireless earpiece 11 or the second wireless earpiece 25 become dislodged or otherwise rendered non-functional if one or more forces is applied to one of the wireless earpieces 10. The components of the wireless earpieces 10 may be coupled utilizing wires, traces, pins, connectors, busses, or so forth. In one embodiment, the connectors for the components may be integrated with the respective earpiece housings 12, 26.

In one embodiment, the first microphone 14 is operatively integrated with the first earpiece housing 12 and the second microphone 28 is operatively integrated with the second earpiece housing 26. Each microphone 14, 28 may be configured to receive sounds from the environment or receive one or more voice commands from the user. For example, the user may issue a voice command to the first microphone 14 to set the first wireless earpiece 11 to transfer tasks to the second wireless earpiece 25 if the battery level of the first wireless earpiece falls below 50%. The user may also issue a voice command to transfer a task from one wireless earpiece to another wireless earpiece irrespective of any prior user or program setting requirements.

The first speaker 16 is operatively integrated with the first earpiece housing 12 and the second speaker 30 is operatively integrated with the second earpiece housing 26. Each speaker 16, 30 may be configured to communicate a warning to the user if the battery life of the first wireless earpiece 11 or the second wireless earpiece 25 is at a critical level or a critical threshold. For example, if the first wireless earpiece 11 reaches its critical threshold, which may be preset or application-specific, the first processor 24 may instruct the first speaker 16 to communicate an audio message indicating the "battery level is at a critical level, recharging is recommended." In response to such a warning, the user may issue a voice command to cease running one or more programs currently running on the left earpiece 11 or transfer one or more of the programs to the second wireless earpiece 25.

In other embodiments, vibrators, electrical contacts, light emitting diodes (LEDs) or other output interfaces may communicate an alert or other indication to the user through tactile feedback, electrical messages, optical signals, or so forth.

In one embodiment, a first battery sensor 18 is operatively integrated with the first earpiece housing 12 and a second battery sensor 32 is integrated with the second earpiece housing 26 and each battery sensor 18, 32 is configured to sense one or more physical and electrical parameters used to measure the battery life of a battery. For example, the first battery sensor 18 may measure a voltage across a current shunt with a known resistance or impedance, wherein the voltage measurement may be used with one or more programs, applications, or algorithms executed by first processor 24 to estimate the current and associated charge at one or more specific points in time. The programs, applications, or algorithms used by first processor 24 may be stored in a memory or the first processor 24. The current estimations may then be subsequently integrated with respect to time using the same or a different program, application, or algorithm executed by the first processor 24 to estimate the amount of charge the first battery 22 has discharged. The battery life may then be estimated by subtracting the estimated amount of charge discharged by first battery 22 from an initial charge state via one or more programs, applications, or algorithms executed by the first processor 24. The initial charge state of first battery 22 may be estimated by comparing a discharge voltage measured across first battery 22 at a known temperature with a discharge profile of a similar battery with respect to capacity at the same temperature. The second battery sensor 32 may estimate the battery life of the second battery 36 in a similar manner as described above. Additional physical and electrical parameters may also be used by one or more programs, applications, or algorithms to estimate the battery life of a battery. These additional physical parameters may include the battery's usable capacity, charge and discharge rates, age, life cycle, chemical composition, hysteresis profile, or other parameters pertinent to estimating the battery life of a battery. The ambient temperature and the physical layout of the circuitry coupled to the battery may also be considered. Finally, more than one type of battery sensor may be employed in each earpiece, and each battery sensor may employ other known methods (e.g., impedance spectroscopy, specific gravity) to estimate the battery life of a battery.

Any number of battery level tracking components, processes, and steps, such as coulomb counters, hysteresis monitoring, gauging algorithms, drift measurements, Kalman filtering, may be utilized to determine the state of the first battery 22 and the second battery 36. Any number of other battery conditions and factors, such as temperature (e.g., in-ear, environmental, etc.), component utilization, battery degradation, and so froth may be utilized A first transceiver 20 is operatively integrated with the first earpiece housing 12 and a second transceiver 34 is operatively integrated with the second earpiece housing 26 and each transceiver 20, 34 is configured to transmit signals encoding data, information, and/or applications related to a task to the other earpiece if the task cannot be performed due to insufficient battery life. In addition, each transceiver 20, 34 may transmit one or more signals encoding data, information, and/or applications related to a task to the other earpiece if it is determined having the other earpiece perform a portion or all the task would maximize the total useful life of the wireless earpieces 10. In some embodiments, extensive information may not be required to load-balance the various tasks. For example, the wireless earpiece 11 off-loading the task may only indicate the task to be performed and the receiving wireless earpiece 25 may utilize the task information to perform the task. Task number, description, or other identifiers may be utilized.

In one embodiment, the determination of whether transferring the data, information, or applications related to a task would maximize the total useful life of the wireless earpieces 10 may be performed by either the first processor 24 or the second processor 38. For example, if first processor 24 of the first wireless earpiece 11 determines a task such as analyzing the user's physiological measurements taken with a pulse oximeter operatively coupled to the first wireless earpiece 11 would use too much charge (power) of the first battery 22, then the first processor 24 may instruct the first transceiver 20 to transmit a signal encoding the physiological measurements sensed by the pulse oximeter to the second transceiver 34 of the second wireless earpiece 25 for analysis. Additional programs, applications, communication instructions, and/or algorithms for use in the analysis of the user's physiological measurements may also be transmitted by the first transceiver 20. In some embodiments, the second wireless earpiece 25 may already have the physiological measurements, and, as a result, the first wireless earpiece 11 may only send a message for the second wireless earpiece 25 to perform the task. The process may also be performed in reverse if the second wireless earpiece 25 is performing the physiological measurement analysis and determines it lacks the power to complete the task. The first transceiver 20 and the second transceiver 34 may be near field magnetic induction (NFMI) transceivers. The transceivers 20 and 34 may also be hybrid, dual-mode, or multi-mode transceivers supporting communications standards and protocols, such as NFMI, Bluetooth, Wi-Fi, cellular signals, and so forth.

The processors 24, 38 may also determine if there is available processing power to perform the task. For example, the first wireless earpiece 11 may send a request for battery status/level, processing requirements, or so forth from the second wireless earpiece 25 before any tasks are off-loaded.

The first battery 22 is operatively coupled to all the components of the first wireless earpiece 11 and the second battery 36 is operatively coupled to all the components of the second wireless earpiece 25. Each of the batteries 11, 36 may provide enough power to operate each of the wireless earpieces 10 for a reasonable duration of time. The first battery 22 and the second battery 36 may be of any type suitable for powering the first wireless earpiece 11 and the second wireless earpiece 25, including alkaline batteries, lithium ion batteries, or any of the energy storage components. Alternatively, battery-less power sources, such as inductive circuits configured to receive energy from radio waves (all of which are operatively coupled to one or more of the wireless earpieces 10) may be used to power the wireless earpieces 10 in lieu of either of the batteries 22, 36.

In one embodiment, the first processor 24 is operatively coupled to each component of the first wireless earpiece 11 and the second processor 38 is operatively coupled to each component of the second wireless earpiece 25. Each processor 24, 38 is configured to execute one or more programs or applications to transfer one or more tasks to the other earpiece if either of the processors determines the task they are currently performing or scheduled to perform either (1) cannot be performed due to insufficient battery life, or (2) would maximize the useful battery life of the set of wireless earpieces 10 to transfer either a portion or all of the task to the other earpiece or data allowing the other earpiece to perform the task. In another embodiment, the task may be transferred in response to resource utilization, such as processor or memory utilization exceeding one or more thresholds. For example, in response to determining the first processor 24 is being utilized above 75%, one or more tasks may be communicated to the second wireless earpiece 25 and associated second processor 38.

In one embodiment, the processors 24, 38 may represent coprocessors. In one example, the first processor 24 may be the primary or master processor and the second processor 38 may be the secondary or slave processor (or vice versa). Any number of tasks, operations, or processing tasks may be off-loaded including, but not limited to, floating point arithmetic, graphics, signal processing, string processing, encryption, or input/output interfacing. The offloading from one of the processors to the others may accelerate performance, preserve battery life, and ensure the wireless earpieces 10 operate more efficiently. All or portions of a task may be offloaded as circumstances require. For example, a first portion of a task may be performed by the first processor 24 and a second portion of the task may be off-loaded to the second processor 38.

In one embodiment, the first processor 24 or the second processor 38 may transfer tasks to one another by executing a program, application, or algorithm stored in a memory to transfer either (1) instructions data, and information for carrying out the tasks, (2) one or more programs, applications, or algorithms for carrying out the tasks, and/or (3) data for use in carrying out the tasks. The tasks may be carried out by the first processor 24 or the second processor 38 may also include background processing tasks, audio processing tasks, sensor data analysis tasks, fitness related tasks, or other computational related tasks. For example, the first processor 24 may determine from prior user preferences stored in a memory a program for measuring jogging distance is likely to use all of the battery life of the first battery 22, and instruct the first transceiver 20 to transmit one or more signals to the second transceiver 34 of the second wireless earpiece 25 encoding (1) instructions to commence the jogging program, (2) instructions to commence the jogging program at the specific point the first processor 24 instructed the first transceiver 20 to transmit the signal to transfer the jogging program task, (3) data of the jogging measurements to be used in the jogging program, (4) one or more programs, applications, or algorithms used to measure jogging distance and/or (5) transmitting the data of the jogging measurements to another wireless device (such as a mobile device or a computer) if the second wireless earpiece 25 lacks such a program. Each processor 24, 38 may run other programs in addition to programs for measuring battery life or determining whether to transfer a task to the other wireless earpiece.

Figure 3:
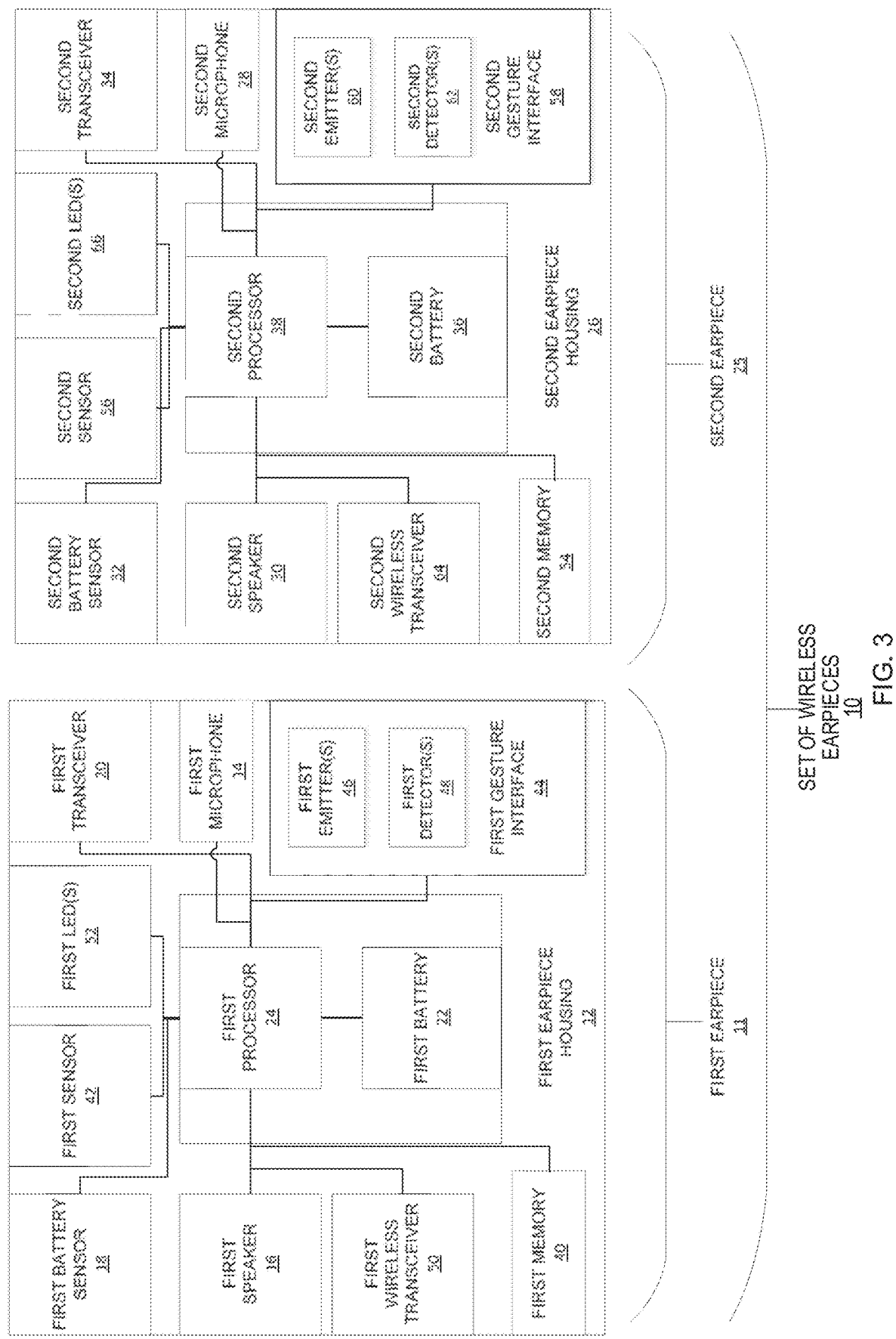
FIG. 3 illustrates a block diagram of a second embodiment of the set of wireless earpieces in accordance with an illustrative embodiment.

FIG. 3 illustrates a second embodiment of the set of wireless earpieces 10 in accordance with an illustrative embodiment. In addition to the elements described in FIG. 2 above, the first wireless earpiece 11 and the second wireless earpiece 25 of the set of wireless earpieces 10 may each include a memory, one or more sensors, a wireless transceiver, a gesture interface, and/or one or more LEDs.

A first memory 40 may be operatively integrated with the first earpiece housing 12, first battery 22, and first processor 24 and second memory 54 may be operatively integrated with the second earpiece housing 26, second battery 36, and second processor 38. Each memory 40, 54 may have one or more programs, applications, or algorithms related to (1) determining the battery life of a battery, (2) transferring a task to the other earpiece, (3) background tasks, audio processing tasks, sensor data analysis tasks and/or fitness tasks desired by the user or required by the earpiece, and/or (4) other tasks required by one of the wireless earpieces. Each memory 40, 54 may also contain files received from an external electronic device such as songs or other related media as well.

A first sensor 42 may be operatively integrated with the first earpiece housing 12, first battery 22, and first processor 24 and a second sensor 56 may be operatively integrated with the second earpiece housing 26, second battery 36, and second processor 38. Each sensor 42, 56 may be configured to sense one or more physiological or environmental parameters for use by the wireless earpieces 10. For example, first sensor 42 may be a pulse oximeter and be configured to measure the heart rate and blood oxygen levels of the user, and second sensor 56 may be a thermometer and configured to measure air pressure in addition to temperature. The sensor readings from the sensors 42, 56 may be used by one or more programs or applications executed by a processor to perform one or more tasks. Sensor readings may also be stored in the first memory 40 or second memory 54 for future use.

A first gesture interface 44 may be operatively integrated with the first earpiece housing 12 and coupled to a first battery 22 and first processor 24 and a second gesture interface 58 may be operatively integrated with the second earpiece housing 26 and coupled to a second battery 36, and second processor 38. The first gesture interface 44 may be configured to allow the user to control one or more functions of the first wireless earpiece 11 and the second gesture interface 58 may be configured to allow the user to control one or more functions of second wireless earpiece 25. The first gesture interface 44 may include one or more emitters 46 and one or more detectors 48 and second gesture interface 58 may include one or more emitters 60 and one or more detectors 62. The emitters 46, 60 and the detectors 48, 62 may be used to detect gestures from either the user, a third party, an instrument, or a combination of the aforementioned and communicate one or more signals representing the gesture to the first processor 24 or the second processor 38. The gestures may be used with the gesture interfaces 44, 58 to control the wireless earpieces 10 including, without limitation, touching, tapping, swiping, use of an instrument, or any combination of the gestures. Touching gestures used to control the wireless earpieces 10 may be of any duration and may include the touching of areas not part of a gesture interface. Tapping gestures used to control the wireless earpieces 10 may include any number of taps and need not be brief. Swiping gestures used to control the wireless earpieces 10 may include a single swipe, a swipe changing direction at least once, a swipe with a time delay, a plurality of swipes, or any combination of the inputs. An instrument used to control the wireless earpieces 10 may be electronic, biochemical or mechanical, and may interface with a gesture interface either physically, wirelessly, or electromagnetically.

A first wireless transceiver 50 may be operatively integrated with the first earpiece housing 12 and coupled to the first battery 22, and first processor 24 and second wireless transceiver 64 may be operatively integrated with the second earpiece housing 26 and second battery 36, and second processor 38. Each wireless transceiver may be configured to receive one or more signals from and transmit one or more signals to an external electronic device. The signals received by the wireless transceivers 50, 64 may be stored in the memories 40, 54 or processed by the processors 24, 38 before being stored in the memories 40, 54. The external electronic devices in communication with the wireless transceivers 50, 64 of the wireless earpieces 10 may include Bluetooth devices, mobile devices, desktops, laptops, tablets, modems, routers, communications towers, cameras, watches, third-party earpieces, earpieces, or other electronic devices capable of transmitting or receiving wireless signals. Each of the wireless transceiver 50, 64 may receive signals encoding programs, applications, or algorithms to be used in transferring tasks between the wireless earpieces 10. Each of the wireless transceivers 50, 64 may receive or transmit more than one signal simultaneously.

In one embodiment, first LEDs 52 may be operatively integrated with the first earpiece housing 12 and coupled to the first battery 22, and first processor 24 and second LEDs 66 may be operatively integrated with the second earpiece housing 26 and coupled to the second battery 36, and second processor 38. First LEDs 52 and second LEDs 66 may be configured to provide information concerning the battery life of the first wireless earpiece 11 and the second wireless earpiece 25, respectively. For example, the first processor 24 may communicate a signal encoding the status of the battery level of the first battery 22 to the first LEDs 52. The signal encoding the battery level of the first battery 22 may be decoded by the first LEDs 52 as a colored light. For example, a green light may represent a substantial level of battery life, a yellow light may represent an intermediate level of battery life, a red light may represent a limited amount of battery life, and a blinking red light may represent a critical level of battery life requiring immediate recharging. The second LEDs 66 may perform similar functions on signals communicated by the second processor 38 of the second wireless earpiece 25. In addition, the battery life may be represented by the LEDs 52, 66 as a percentage of battery life remaining or may be represented by an energy bar having one or more LEDs. In one embodiment, the number of illuminated LEDs 52, 66 represents the amount of battery life remaining in the wireless earpieces 10. In addition, the LEDs 52, 66 may decode signals received from the processors 24, 38 related to the current time, the status of one or more operations of the wireless earpieces 10, or another earpiece function and display the information encoded in the signals. Each of the LEDs 52, 66 may be in any area on the wireless earpieces 10 suitable for viewing by the user or a third party and may also consist of as few as one diode which may be provided in combination with a light guide. In addition, the LEDs need not have a minimum luminescence.

Figure 4:
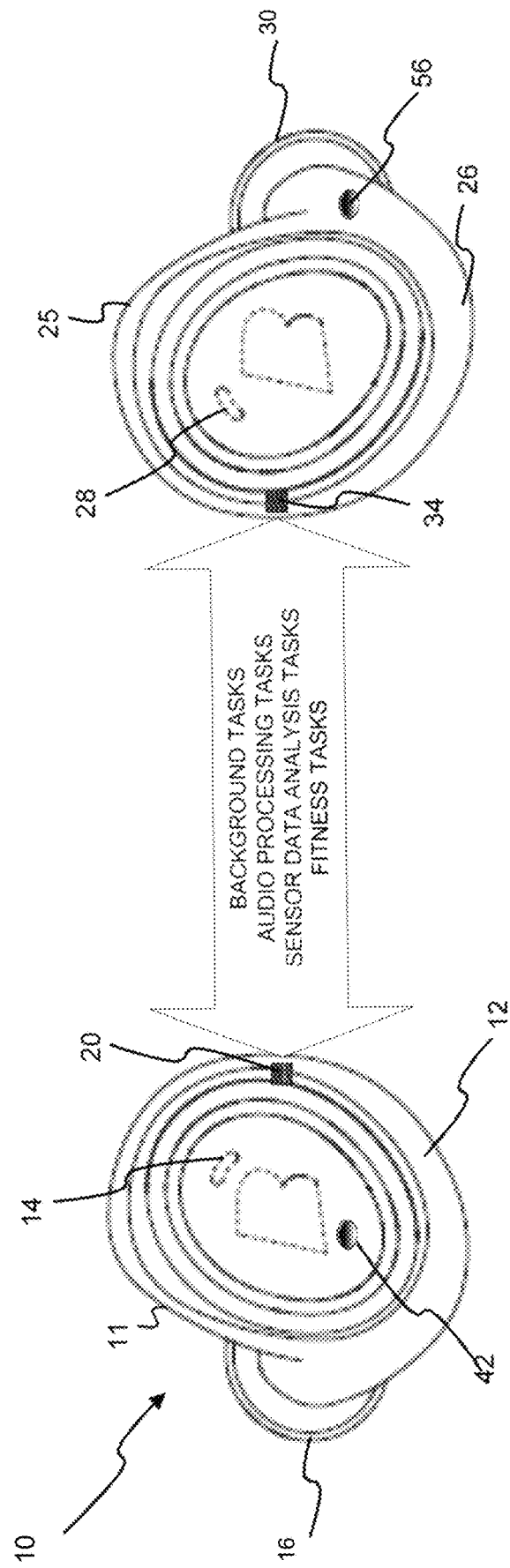
FIG. 4 illustrates a pictorial representation of the set of wireless earpieces and the relationship between a first earpiece and a second wireless earpiece when sharing one or more tasks in accordance with an illustrative embodiment.

FIG. 4 illustrates the set of wireless earpieces 10 which includes the first wireless earpiece 11 and the second wireless earpiece 25 in accordance with an illustrative embodiment. The first wireless earpiece 11 includes the first earpiece housing 12. The second wireless earpiece 25 includes the second earpiece housing 26. The first wireless earpiece 11 and the second wireless earpiece 25 may each be configured to fit on, at, or within a user's external auditory canal and may be configured to substantially minimize or eliminate external sound capable of reaching the tympanic membrane. The first earpiece housing 12 and the second earpiece housing 26 may be configured to be soundproof or waterproof. The first microphone 14 is shown on first wireless earpiece 11 and the second microphone 28 is shown on the second wireless earpiece 25 and each microphone 14, 28 may be configured or positioned to receive voice commands or ambient sounds as necessary.

A first transceiver 20 and second transceiver 34 are also shown. Each of the transceivers 20, 34 may be NFMI transceivers and may be configured to transmit signals to or receive signals from the other wireless earpiece concerning tasks being currently performed or to be performed in the future. The signals may be transmitted or received through or around the user's head. A first speaker 16 and second speaker 30 are also shown and may be configured to communicate tasks being performed on their respective wireless earpieces 10 or tasks transmitted from the other wireless earpiece. For example, if the second speaker 30 was communicating information related to a workout and the second processor 38 determined the battery life of second battery 36 was insufficient to complete the task, the second processor 38 may instruct the second transceiver 34 to transmit a signal encoding the information to be communicated to the user to the first processor 24 via the first transceiver 20. The first processor 24 may then subsequently instruct the first speaker 16 to communicate the information related to the workout. First sensor 42 and second sensor 56 are shown. Each of the sensors 42, 56 may be located anywhere on the wireless earpieces 10 conducive to acquiring sensor readings and the sensor readings may be encoded in signals transmitted or received by one of the transceivers.

Figure 5:
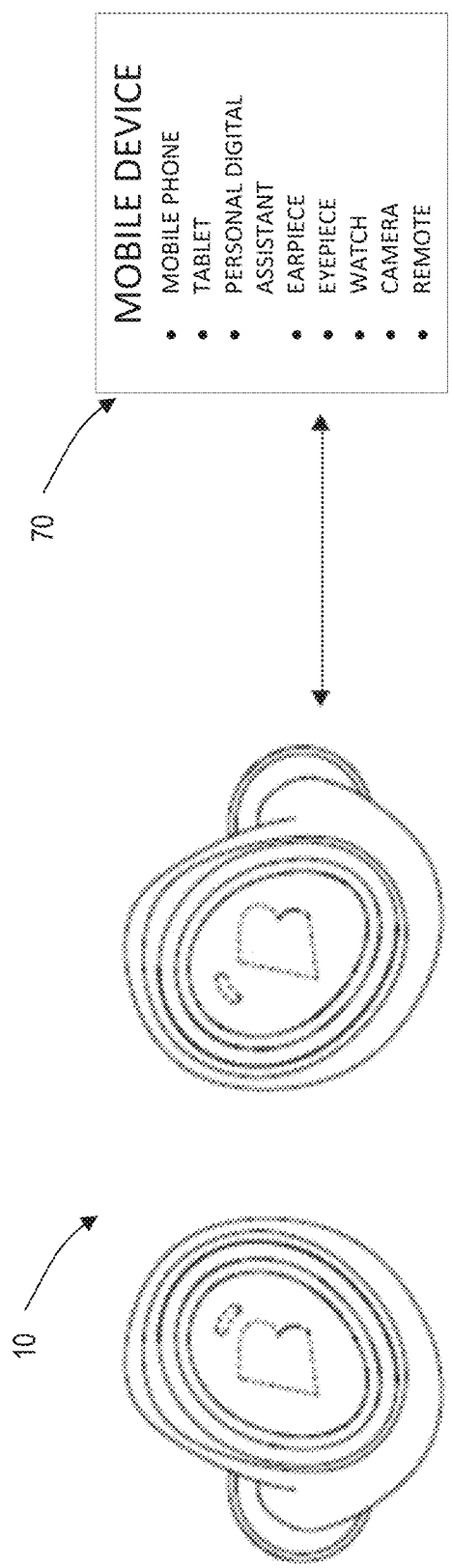
FIG. 5 illustrates a relationship between the set of wireless earpieces and a mobile device in accordance with an illustrative embodiment.

FIG. 5 illustrates the set of wireless earpieces 10 and their relationship to a mobile device 70 in accordance with an illustrative embodiment. The mobile device 70 may be a mobile phone, a tablet, a watch, a PDA, a remote, an eyepiece, an earpiece, any wearable device, or any electronic device not requiring a fixed location. The user may use a software application on the mobile device 70 to transfer one or more tasks from one wireless earpiece to the other wireless earpiece. For example, the user may use a software application on the mobile device 70 to access a screen providing one or more options related to transferring one or more tasks between the wireless earpieces. The tasks may be transferred including background tasks such as antivirus programs or energy usage programs, audio processing tasks such as music playback applications or sound encoded in a news broadcast received from an external electronic device, sensor data analysis tasks such as heart rate or blood oxygen programs, fitness programs such as distance tracking applications, or other programs or applications executable by an earpiece. Selections may be communicated via a transceiver in the mobile device 70 to the set of wireless earpieces 10. In addition, the mobile device 70 may also be a remote wirelessly transmitting signals derived from manual selections provided by the user or a third party on the remote to the set of wireless earpieces 10. The wireless earpieces 10 may communicate with the mobile device 70 giving various commands, such as but not limited to, providing instructions making phone calls, communicating with Alexa, Cortana, Siri etc., and/or browse the internet.

Figure 6:
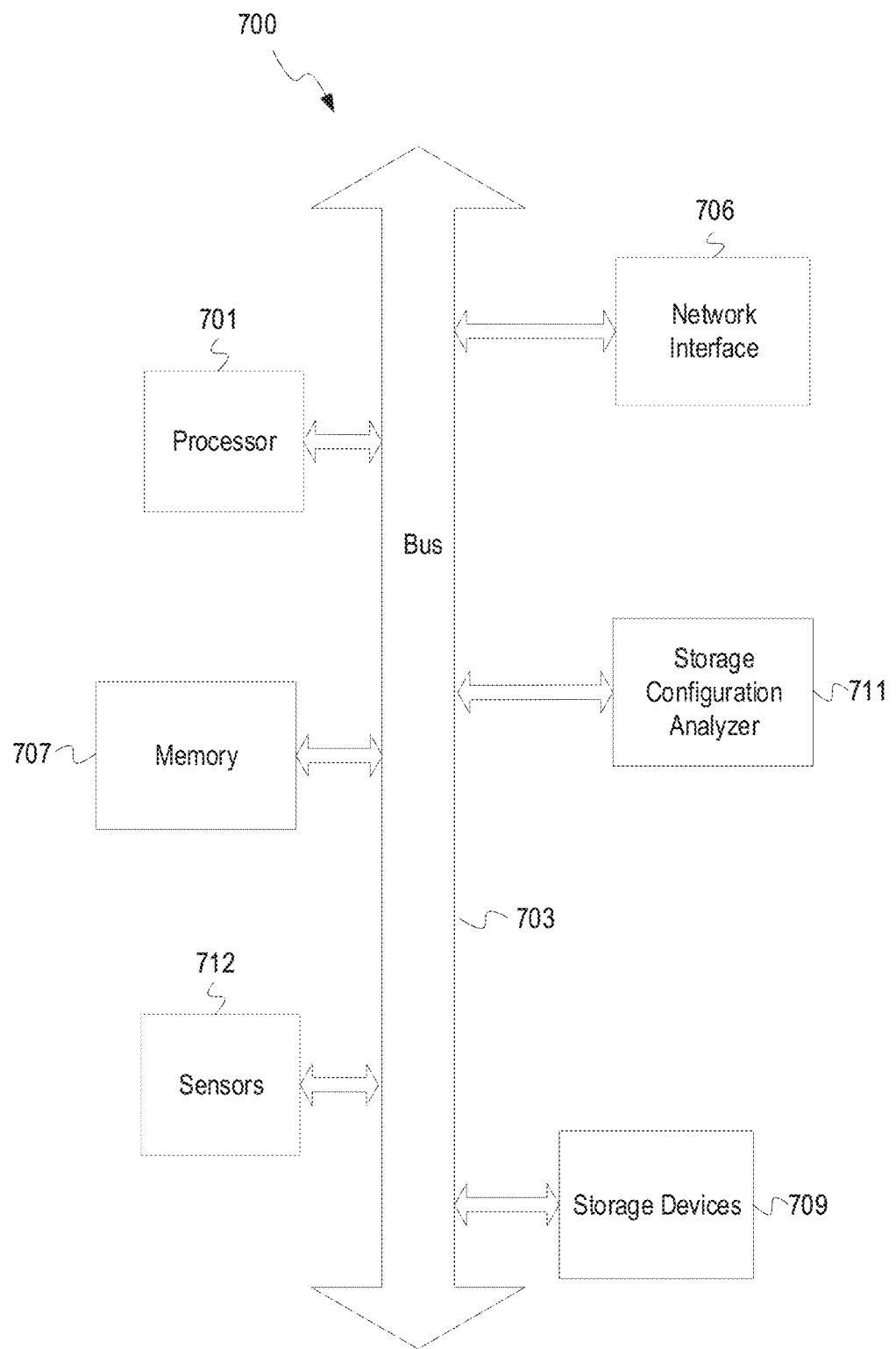
FIG. 6 illustrates a computing system in accordance with an illustrative embodiment.

FIG. 6 depicts a computing system 700 in accordance with an illustrative embodiment. For example, the computing system 700 may represent the mobile device 70 discussed in FIG. 5 and/or other constrained intelligent edge real time embedded devices (CIERTED) such as those shown in FIG. 7. The computing system 700 includes a processor unit 701 (possibly including multiple processors, multiple cores, multiple nodes, and/or implementing multi-threading, etc.). The computing system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 703 (e.g., PCI, ISA, PCI-Express, HyperTransport®, InfiniBand®, NuBus, etc.), a network interface 706 (e.g., an ATM interface, an Ethernet interface, a Frame Relay interface, SONET interface, wireless interface, etc.), and a storage device(s) 709 (e.g., optical storage, magnetic storage, etc.).

The system memory 707 embodies functionality to implement all or portions of the embodiments described above and below. The system memory 707 may include one or more applications or sets of instructions for implementing task and/or load sharing mode with one or more wireless earpieces 10. In one embodiment, specialized task and/or load sharing management software may be stored in the system memory 707 and executed by the processor unit 702. The task and/or load sharing management software may be utilized to manage user preferences (e.g., settings, automated processes, etc.), communications, input, and device actions, synchronize devices, task and/or load sharing specific abstract application hierarchy, complex system task and/or load sharing abstract application hierarchy or so forth. As noted, the task and/or load sharing management application or software may be similar or distinct from the task and/or load sharing application or software utilized by the wireless earpieces 10. Code may be implemented in any of the other devices of the computing system 700. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 4 (e.g., video cards, audio cards, additional network interfaces, peripheral devices, etc.). The processor unit 701, the storage device(s) 709, the sensors 712 and the network interface 705 are coupled to the bus 703. Although illustrated as being coupled to the bus 703, the memory 707 may be coupled to the processor unit 701. The computing system 700 may further include sensors 712 being any number of optical sensors, accelerometers, magnetometers, microphones, gyroscopes, temperature sensors, and so forth for verifying user biometrics, or environmental conditions, such as motion, light, or other events associated with mobile devices 70 or the CIERTED or their environment.

In one embodiment, the wireless earpieces 10 may automatically connect to a nearest mobile device 70 and/or CIERTED. For example, the wireless earpieces 10 and the mobile device 70 and/or CIERTED may have been previously paired. In another embodiment, the wireless earpieces 10 may connect to a mobile device 70 and/or CIERTED based on user input, feedback, or instructions, such as a directional gesture, voice command, head motion or so forth. The wireless earpieces 10 may be linked, connected or paired (or disconnected, unpaired) in real-time based on user input. For example, the wireless earpieces 10 may switch between a first link with a first CIERTED to a second link with a second CIERTED.

With reference to FIG. 7 embedded devices within an IoT network in an illustrative embodiment is shown. CIERTED and wireless earpieces 10, are shown with other CIERTED in IoT network 822. IoT network 822 is the network of CIERTED, such as, vehicles 830, home appliances 832 and other items embedded with electronics, software, sensors, actuators and network connectivity which enables these objects to connect and exchange data and instructions. Each CIERTED is uniquely identifiable through its embedded computing system but can inter-operate within the existing Internet infrastructure 800. The IoT network 822 allows objects to be sensed or controlled remotely across existing network infrastructure 800, creating opportunities for more direct integration of the physical world into computer-based systems, and resulting in improved efficiency, accuracy and economic benefit in addition to reduced human intervention.

CIERTED in the IoT network 822, can refer to a wide variety of devices such as wireless earpieces 10, vending machine 840, gaming system 842, smart watch 844, automobiles 830 with smart radios 880, smart home 820 with smart HVAC 860 or refrigerator 832 or mobile device 70. These CIERTED collect useful data with the help of various existing technologies and then autonomously flow the data between other devices. These items are but a small list of the possible CIERTED. While only a handful of CIERTED have been shown in the present application, it is fully contemplated most any electronic device having processing capabilities could be a CIERTED without departing from the spirit of the invention.

CIERTED can identify and couple with any identifiable CIERTED, either locally through direct communications 850 or through an internet network 800. Once CIERTED are paired with other CIERTED, they can interact, control functionality and/or communicate with these CIERTED. Furthermore, wireless earpieces 10 can be used to task and/or load share data or instructions with other CIERTED through the IoT network 822.

When a user is at or near a smart home 820, wireless earpieces 10 could couple and/or pair with smart home 820 and task and/or load share with smart home 820 by assigning data to process and/or tasks and instructions to perform. By doing this, wireless earpieces use significantly less processing power and can stretch the battery life of wireless earpieces 10 significantly longer. Further, because smart home 820 is coupled to a battery-less power source there is no concern over depleting either the right or left wireless earpiece 10 nor the power source for the smart home 820.

Through the IoT network 800 task and/or load sharing with any CIERTED is possible. If wireless earpieces 10 can pair or communicate with the CIERTED a task and/or load sharing protocol can be initiated as discussed in detail above regarding interoperability between the wireless earpieces 10. If the CIERTED do not have the instructions for performing the requested operations, then wireless earpieces 10 can send them via the network 800 or through direct communications 850. There would of course be some limitations based on privacy concerns and issues negating the efficient use of bandwidth (i.e., transferring large amounts of data to other CIERTED to perform tasks instead of performing the operations locally; Edge computing); however, wireless earpieces 10 can have this built into the programming to balance the use of bandwidth with battery conservation and optimization. It is also further contemplated, if a CIERTED is heavily tasked and cannot take on additional tasks without significantly slowing down, then the CIERTED could reject a task and/or load sharing request from the wireless earpieces 10 and wireless earpieces 10 could move on to another CIERTED to request task and/or load sharing.

The wireless earpieces 10 may also utilize edge computing to make task and/or load sharing operation efficient and seamless. Edge computing is a method of optimizing cloud-computing systems by performing data processing at the edge of the network 800, near the source of the data. For purposes of the present invention, each CIERTED, mobile device 70, vehicle 830, smart home 820, smart watch 844, gaming system 842 and vending machine 840 all could have the computing system 700 discussed thoroughly above. Because each CIERTED has a computing system, data processing can be performed at each device, thus reducing the communications bandwidth needed between the peripheral devices and the central data center 880 by performing analytics and knowledge generation at or near the source of the data; the wireless earpieces 10.

Edge computing pushes applications, data and computing power (services) away from wireless earpieces 10 to the nearest CIERTED. For example, when in proximity to gaming system 842, which has a lasting power source (i.e., wall power) wireless earpieces 10 could conserve battery power by task and/or load sharing with gaming system 842 if gaming system 842 could support the request. If not, wireless earpieces 10 could choose to perform their own tasks or find the next nearest CIERTED, smart watch 844, and request it perform the task and/or load sharing request. In this way, devices which are battery powered could conserve their battery power and go longer between the need for charging. Edge computing replicates fragments of information across distributed networks 822 of CIERTED, which may spread over a vast area. As a technological paradigm, edge computing is also referred to as mesh computing, peer-to-peer computing, autonomic (self-healing) computing, grid computing and by other names implying non-centralized, node-less availability.

Various methods and apparatus's have been shown and described relating to load sharing between wireless earpieces. The present invention is not to be limited to these specific examples but contemplates any number of related methods, system, and apparatus and these examples may vary based on the specific type of wireless earpieces, the specific type of mobile devices or other wearable devices, and other considerations. The illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated other alternatives or exemplary aspects are considered included in the disclosure. The description is merely examples of embodiments, processes or methods of the invention. It is understood any other modifications, substitutions, and/or additions may be made, which are within the intended spirit and scope of the disclosure. For the foregoing, it can be seen the disclosure accomplishes at least all the intended objectives. The previous detailed description is of a small number of embodiments for implementing the invention and is not intended to be limiting in scope. The following claims set forth many of the embodiments of the invention disclosed with greater particularity.

What is claimed is:

1. A method for battery management between a set of wireless earpieces comprising a first wireless earpiece with a first processor and a second wireless earpiece with a second processor, the method comprising:
    monitoring a first battery level of a first battery within the first wireless earpiece using a first sensor operatively coupled to the first battery and disposed within the first wireless earpiece;
    monitoring processor utilization for the first wireless earpiece;
    monitoring a second battery level of a second battery within the second wireless earpiece using a second sensor operatively coupled to the second battery and disposed within the second wireless earpiece;
    monitoring processor utilization for the second wireless earpiece;
    determining the first battery level of the first battery within the first wireless earpiece, the processor utilization for the first wireless earpiece, the second battery level of the second battery within the second wireless earpiece, and the processor utilization for the second wireless earpiece in order to assign by the set of wireless earpieces a first processing task to either the first wireless earpiece or the second wireless earpiece based on the first battery level of the first battery within the first wireless earpiece, the second battery level of the second battery within the second wireless earpiece, the processor utilization for the first wireless earpiece, and the processor utilization for the second wireless earpiece;
    assigning by the set of wireless earpieces the first processing task to one of the first wireless earpiece and the second wireless earpiece based on the first battery level of the first battery within the first wireless earpiece, the second battery level of the second battery within the second wireless earpiece, the processor utilization for the first wireless earpiece, and the processor utilization for the second wireless earpiece;
    performing the first processing task at one of the first wireless earpiece and the second wireless earpiece;
    communicating a command of the first processing task from the set of wireless earpieces to a mobile device.

2. The method of claim 1, further comprising communicating the first processing task to one of the first wireless earpiece and the second wireless earpiece using a wireless transceiver.

3. The method of claim 1, wherein the first processing task is selected from a set consisting of a background processing task, an audio processing task, and a sensor data analysis processing task.

4. The method of claim 1, further comprising communicating an audio message to a speaker of the set of wireless earpieces indicating the first battery level of the first battery within the first wireless earpiece is below a critical threshold when the first battery level of the first battery within the first wireless earpiece is below the critical threshold.

5. The method of claim 4 further comprising receiving at the set of wireless earpieces a voice command from a user to cease performing the first processing task where the first battery level of the first battery within the first wireless earpiece is below the critical threshold.

6. The method of claim 1 wherein the first wireless earpiece further comprises:
    an earpiece housing;
    the first processor within the earpiece housing;
    a microphone operably coupled with the first processor;

a speaker operably coupled with the first processor;
the first battery operably coupled with the first processor;
sensors operably coupled with the first processor including the first sensor; and
a transceiver operably coupled with the first processor.

7. The method of claim 1 wherein each of the first wireless earpiece and the second wireless earpiece further comprises:
an earpiece housing;
the second processor within the earpiece housing;
a microphone operably coupled with the second processor;
a speaker operably coupled with the second processor;
sensors operably coupled with the second processor including the first sensor; and
a transceiver operably coupled with the second processor.

8. A method for battery management between a set of wireless earpieces, the set of wireless earpieces comprising a first wireless earpiece with a first processor and a second wireless earpiece with a second processor, the method comprising:
monitoring a first battery level of a first battery within the first wireless earpiece using a first sensor operatively coupled to the first battery and disposed within the first wireless earpiece;
monitoring processor utilization for the first wireless earpiece;
monitoring a second battery level of a second battery within the second wireless earpiece using a second sensor operatively coupled to the second battery and disposed within the second wireless earpiece;
monitoring processor utilization for the second wireless earpiece;
determining the first battery level of the first battery within the first wireless earpiece, the processor utilization for the first wireless earpiece, the second battery level of the second battery within the second wireless earpiece, and the processor utilization for the second wireless earpiece in order to assign a first processing task to one of the set of wireless earpieces and to a device coupled to an Internet of Things (IoT) network operatively connected to the set of wireless earpieces based on the first battery level of the first wireless earpiece, the processor utilization for the first wireless earpiece, the second battery level of the second wireless earpiece, and the processor utilization for the second wireless earpiece;
assigning by the set of wireless earpieces the first processing task to the device coupled to the IoT network based on the first battery level of the first battery within the first wireless earpiece, the processor utilization of the first wireless earpiece, the second battery level of the second battery within the second wireless earpiece, and the processor utilization of the second wireless earpiece;
communicating the assigned first processing task to the device; and
performing the assigned first processing task at the device coupled to the IoT network based on the first battery level of the first battery within the first wireless earpiece, the processor utilization of the first wireless earpiece, the second battery level of the second battery within the second wireless earpiece, and the processor utilization of the second wireless earpiece.

9. The method of claim 8 wherein the communicating the first processing task to the device is performed with a wireless transceiver.

10. The method of claim 8 wherein the first battery level of the first battery within the first wireless earpiece and the second battery level of the second battery within the second wireless earpiece are based on preferences set by a user of the set of wireless earpieces.

11. The method of claim 8, wherein the first processing task is selected from a set consisting of a background processing task, an audio processing task, and a sensor data analysis processing task.

12. The method of claim 8 further comprising communicating an audio message to a speaker of the set of wireless earpieces indicating the first battery level of the first battery within the first wireless earpiece is below a critical threshold when the first battery level of the first battery within the first wireless earpiece is below the critical threshold.

13. The method of claim 12 further comprising receiving at the set of wireless earpieces a voice command from a user about processing of the first task.

14. The method of claim 8 wherein the first wireless earpiece further comprises:
an earpiece housing;
the first processor within the earpiece housing;
a microphone operably coupled with the first processor;
a speaker operably coupled with the first processor;
the first battery operably coupled with the first processor;
sensors operably coupled with the first processor including the first sensor; and
a transceiver operably coupled with the first processor.

15. The method of claim 12 wherein each of the first wireless earpiece and the second wireless earpiece further comprises:
an earpiece housing;
the second processor within the earpiece housing;
a microphone operably coupled with the second processor;
a speaker operably coupled with the second processor;
sensors operably coupled with the second processor including the first sensor; and
a transceiver operably coupled with the second processor.

16. A method for battery management between a set of wireless earpieces, the set of wireless earpieces comprising a first wireless earpiece with a first processor and a second wireless earpiece with a second processor, the method comprising steps of:
monitoring a first battery level of a first battery within the first wireless earpiece using a first sensor operatively coupled to the first battery and disposed within the first wireless earpiece;
monitoring processor utilization for the first wireless earpiece;
monitoring a second battery level of a second battery within the second wireless earpiece using a second sensor operatively coupled to the second battery and disposed within the second wireless earpiece;
monitoring processor utilization for the second wireless earpiece;
requesting at least one of the second battery level of the second wireless earpiece by the first wireless earpiece and the first battery level of the first wireless earpiece by the second wireless earpiece;
requesting at least one of the processor utilization of the second wireless earpiece by the first wireless earpiece and the processor utilization of the second wireless earpiece by the first wireless earpiece;
determining the first battery level of the first battery within the first wireless earpiece, the second battery level of the second battery within the second wireless earpiece, the processor utilization for the first wireless earpiece, and the processor utilization for the second wireless earpiece in order to assign by the set of wireless earpieces a first processing task to either the first wireless earpiece or the second wireless earpiece based on the first battery level of the first battery within the first wireless earpiece, the second battery level of the second battery within the second wireless earpiece, the processor utilization for the first wireless earpiece, and the processor utilization for the second wireless earpiece;

assigning by the set of wireless earpieces the first processing task to one of the first wireless earpiece and the second wireless earpiece based on the first battery level of the first battery within the first wireless earpiece, the processor utilization for the first wireless earpiece, the second battery level of the second battery within the second wireless earpiece, and the processor utilization for the second wireless earpiece;

performing the first processing task at one of the first wireless earpiece and the second wireless earpiece;

wherein each of the steps is performed at the set of wireless earpieces.

17. The method of claim 16, further comprising communicating the first processing task to one of the first wireless earpiece and the second wireless earpiece using a wireless transceiver.

18. The method of claim 16, wherein the first processing task is selected from a set consisting of a background processing task, an audio processing task, and a sensor data analysis processing task.

19. The method of claim 16, further comprising communicating an audio message to a speaker of the set of wireless earpieces indicating the first battery level of the first battery within the first wireless earpiece is below a critical threshold when the first battery level of the first battery within the first wireless earpiece is below the critical threshold.

20. The method of claim 19 further comprising receiving at the set of wireless earpieces a voice command from a user to cease performing the first processing task where the first battery level of the first battery within the first wireless earpiece is below the critical threshold.

* * * * *